(12) United States Patent
Hayes

(10) Patent No.: US 10,375,118 B2
(45) Date of Patent: Aug. 6, 2019

(54) METHOD FOR ATTRIBUTION SECURITY SYSTEM

(71) Applicant: John William Hayes, Reno, NV (US)

(72) Inventor: John William Hayes, Reno, NV (US)

(73) Assignee: BlackRidge Technology Holdings, Inc., Reno, NV (US)

( * ) Notice: Subject to any disclaimer, the term of this patent is extended or adjusted under 35 U.S.C. 154(b) by 0 days.

(21) Appl. No.: 14/545,988

(22) Filed: Jul. 13, 2015

(65) Prior Publication Data

US 2017/0019426 A1  Jan. 19, 2017

(51) Int. Cl.
*H04L 29/06* (2006.01)

(52) U.S. Cl.
CPC ........ *H04L 63/205* (2013.01); *H04L 63/0245* (2013.01); *H04L 63/0254* (2013.01)

(58) Field of Classification Search
None
See application file for complete search history.

(56) References Cited

U.S. PATENT DOCUMENTS

| | | | | |
|---|---|---|---|---|
| 8,958,293 | B1* | 2/2015 | Anderson | H04L 67/1002 370/230 |
| 2005/0289181 | A1* | 12/2005 | Deninger | H04L 67/2819 |
| 2010/0235879 | A1* | 9/2010 | Burnside | H04L 63/0263 726/1 |
| 2013/0246377 | A1* | 9/2013 | Gaitonde | H04L 63/0236 707/697 |

* cited by examiner

*Primary Examiner* — Brandon S Hoffman
(74) *Attorney, Agent, or Firm* — Thomas N. Giaccherini

(57) ABSTRACT

Methods and apparatus for providing a mechanism that uses attribution information present in some network traffic to provide enhanced security for all network services protected by an attribution security system are disclosed.

43 Claims, 6 Drawing Sheets

PRIOR ART

PRIOR ART

METHOD FOR ATTRIBUTION SECURITY SYSTEM

CROSS-REFERENCE TO A RELATED U.S. PATENT APPLICATION & CLAIM FOR PRIORITY

None.

FEDERALLY SPONSORED RESEARCH OR DEVELOPMENT

None.

FIELD OF THE INVENTION

The present invention pertains to methods for efficiently and securely protecting network services when the network traffic contains a mixture of attributable and non-attributable traffic.

BACKGROUND OF THE INVENTION

In cyber security, determining attribution is one of the most difficult challenges. Attribution in cyber security is the determination of the actor responsible for an action. Attribution on the Internet can mean the owner of the machine (e.g. XYZ Corporation), the physical location of the machine (e.g. Fremont, Calif., China) or the individual who is actually responsible for the action.

Attribution on the Internet has not been universally solved. But there are technologies available that enable an organization to insert attribution markers into their network traffic. These attribution markers allow an organization to differentiate between network traffic originating from an actor associated with the organization and traffic originating from actors not associated with the organization. At first, these attribution technologies were deployed as standalone security devices. In the present invention, attribution technologies are integrated with conventional network security devices and can be shown to provide additional protections to both attributable and non-attributable network traffic. This constitutes a major technological advance, and would satisfy long felt needs and aspirations in the cyber security industry.

SUMMARY OF THE INVENTION

The present invention adds attribution information to the available policy descriptions. With this new attribution information, a security policy engine learns associations between attribution information and network addresses. This learned attribution associations can then be used to filter incoming network traffic, potentially discarding or prioritizing the traffic based of previously determined attribution associations, protecting all downstream network resources, including both network resources that require attribution and those network resources that do not.

A BRIEF DESCRIPTION OF THE DRAWINGS

A DETAILED DESCRIPTION OF PREFERRED & ALTERNATIVE EMBODIMENTS

I. Overview of the Invention

Figure 1:
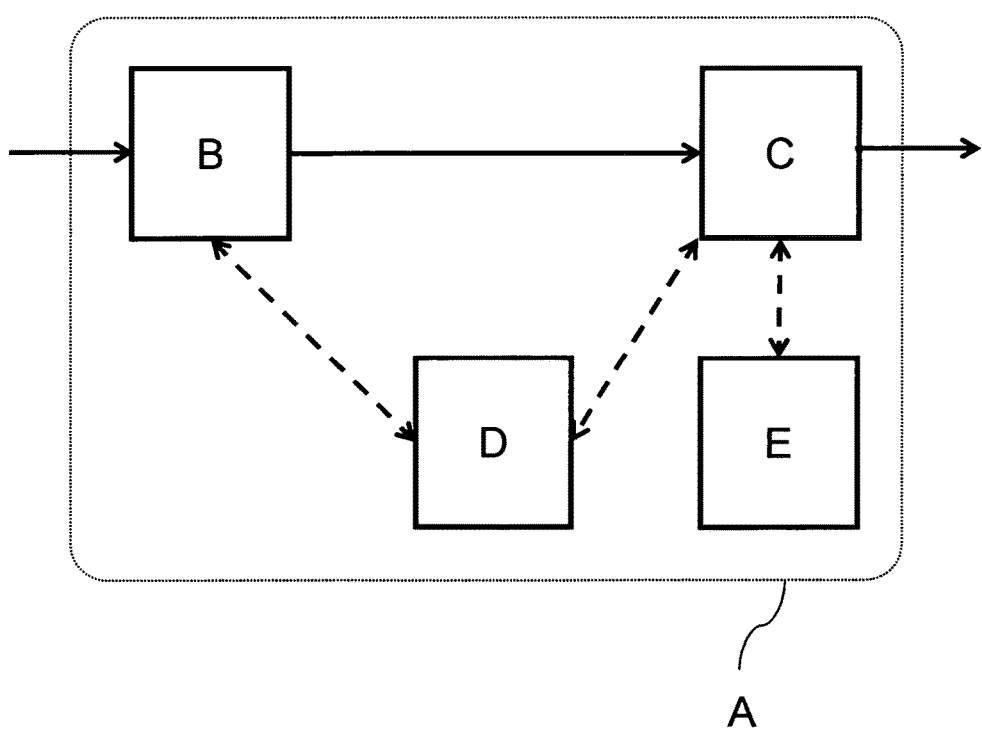
FIG. 1 is an illustration of the prior art.

An attribution security system 10 extends a conventional network firewall by adding an attribution information collector 14, and a protection filter 24 and extending the security policy engine 16 to support attribution information. A conventional stateful firewall A is generally composed of a network information collector B, a security policy engine C, a network state table D and a table of security policies E. The network information collector B extracts network information from network traffic and stores it in the network state table D. Network information is information about the conveyance of application data. This includes TCP/UDP/IP information and may include lower protocol layer information. Network information does not include network payload data or application data. PKI certificates are generally much larger than network protocol information and thus are usually carried in the network payload. As with all layered protocols, the payload of one layer is the protocol of the next higher layer. In the present invention, network information refers to what is conventionally described as layers 2-4 of the OSI protocol stack, specifically the data link layer, the network layer and the transport layer. Information above the transport layer, including application data and protocols such as the Secure Sockets Layer (SSL) are considered to be application data. The network state table D maintains information about each flow of network traffic and any pertinent network protocol state information such as TCP session state. The security policy engine C uses the information provided in the network state table D classify the network traffic to determine the proper behavior, selecting one of the configured policies in the table of security policies E. In a conventional stateful firewall A, policies are based upon network addresses (MAC addresses, IPv4 addresses, IPv6 addresses), network port numbers, the network topology and state transitions within a given protocol. Conventional stateful firewalls are unable to provide any form of attribution. When an attribution information collector 14 is integrated into a conventional stateful firewall A, forming an attribution security system 10, attribution information, when it is present, is also stored in the network state table 18. This enables the security policy engine 16 to add attribution information to policy descriptions available to a network administrator. With this new attribution information, the security policy engine 16 is able to associate attribution information with network address information and to determine which network addresses lack attribution information. These learned associations between attribution information and network addresses can then be communicated to a protection filter 24. The protection filter 24 sits ahead of the network information collector 12 and filters incoming network traffic, potentially discarding or prioritizing the traffic based of previously determined attribution associations, protecting all downstream network resources, including both network resources that require attribution and those network resources that do not.

An attribution security system can be implemented as a standalone security device, as a functional blade or module within a larger security device, as a virtual service, as a virtual device, or as an endpoint service deployed on network clients and servers. An attribution security system can be offered as a managed service, as a cloud service or as an on-demand service provided by a network function virtualization (NFV) device or application.

There are a number of methods to determine attribution including Transport Access Control and Statistical Object Identification.

II. Statistical Object Identification

Statistical Object Identity (SOI) is described in U.S. Pat. No. 8,572,697, entitled Method for Statistical Object Identification, and in U.S. Ser. No. 13/987,747, entitled Method for Statistical Object Identification, and are incorporated by reference herein.

Statistical Object Identity (SOI) solves the problem of communicating large credentials, called certificates, at the network layer by reducing the information in the certificate which is used to authenticate the communication before it is allowed to proceed by converting the certificate to a much smaller "statistical object." SOI allows the network to determine the identity of the initiator of the communication before the communication is given access to the network. This method provides a security feature that substantially eliminates potentially detrimental and malicious attacks that could be perpetrated on the network using conventional technology.

SOI operates by using an identity certificate as an original object and using a sender to communicate a stream of statistical objects, based on the original object, to a communications receiver. The communications receiver aggregates the received statistical objects until an original object is unambiguously determined and the calculated probability satisfies a trusted probability threshold. If the communications receiver fails to unambiguously determine the original object or if the calculated probability fails to satisfy the probability threshold, the original object, the identity, is not recognized. An indication is made to communicate the identity determined by SOI or an indication is made to communicate of the lack of identity.

III. Transport Access Control

Transport Access Control (TAC) is described in U.S. Pat. No. 8,346,951, entitled Method for First Packet Authentication, and is incorporated by reference herein.

TAC provides a mechanism to authenticate a network connected device on the first packet of a TCP session request. The authentication mechanism uses various fields in the IP and TCP headers in the TCP connection request. All of these fields have a primary function that is defined in the IP and TCP specifications. The use of existing fields to pass an authorization key is necessary because the TCP protocol specification does not provide a mechanism to pass user data on a TCP connection request.

TAC provides an authentication mechanism that functions using only the fields in the IP and TCP headers that are normally present in the TCP connection establishment request. Within the IP and TCP headers there are fields that have strictly defined meanings that do not allow any additional encoding because this would alter the functionality of the IP and/or TCP protocols. Examples of such fields are the Source Address, Destination Address, Checksum, Source Port and Destination Port fields.

Within the TCP header, on a connection request (TCP-SYN), the Sequence Number (SEQ) field specifies the starting sequence number for which subsequent data octets are numbered. Additional TCP specifications recommend that this number be randomly generated.

A remote network device (TCP session initiator) generates an authorization key, now called an identity token. The initiator then sends a TCP connection request, inserting the authorization key in the SEQ field of the TCP header 14, to the desired network connected device. The receiving device, upon receiving the connection request, extracts the authorization key. The receiving device then processes the authorization key to authenticate it.

IV. Definition of Terms

Actor—An individual or combination of hardware or software, which causes a change in state in a network or device.

Computer Application—Computer software that performs specific tasks.

Application Information—Information communicated by or between computer applications. Application information is communicated in the payload portion of network packets.

Arbitrary Network Topology—Without regard to the layout of devices on a network.

Attribution—The determination of the actor responsible for an action.

Attribution on the Internet can mean the owner of the machine (e.g. XYZ Corporation), the physical location of the machine (e.g. Fremont, Calif., China) or the individual who is actually responsible for the action.

Authentication—The process of verifying the authenticity of a presented identity credential.

Authentication Device—A device that performs authentication.

Bidirectional Authentication—Authentication that occurs between two parties where each party is authenticated. This is in contrast to unidirectional authentication where only one party is authenticated.

Connection—A logical pairing of two devices that enable them to communicate. A connection utilizes a series of packets to accomplish this. A TCP connection is an example of a connection.

Connection Request—A request by one device to another device to create a connection.

Device—A device is any object that is capable of being attached or connected to and communicating on a network. Examples of devices include computers, servers, clients, laptops, PDAs, cell phones, smart phones, network appliances, storage systems, virtual appliances, switches, routers, load balancers, caches, intrusion detection systems, VPNs, authentication devices, intrusion prevention systems, and firewalls.

Endpoint—Any network device that has an IP address and the ability to perform TCP/IP protocol processing.

Endpoint Security—Security processing performed on an endpoint. This may include identity credential authentication, access authorization, policy enforcement, behavioral analysis, logging and other security related actions and behaviors.

Firewall—A network security device or method that regulates network traffic based on a set of security rules.

Hypervisor—In virtualization technology, a hypervisor is a software program that manages multiple operating systems (or multiple instances of the same operating system) on a single computer system.

Identity—The fact of being who or what a person or thing is.

Identity Credential—An object that is verified when presented to the verifier in an authentication transaction. Identity Credentials may be bound in some way to the individual or device to whom they were issued.

IP—IP is the Internet Protocol. The Internet Protocol is a data oriented protocol used by devices to communicate across a packet switched network. IP information is carried by an IP header in an IP packet. The IP header contains device address information, protocol control information and user data information.

Logging Device—A device that receives and processes logs from other devices, often for purposes of aggregation, storage, display, data mining or analytics.

Log Information—Information communicated to a logging device to provide information for recordation, analysis, forensics, accounting or other informational purposes.

Network—A network is a collection of computers, servers, clients, routers and devices that are connected together such that they can communicate with each other. The Internet is an example of a network.

Network Appliance—A fixed function device attached to a network for the purpose of performing set of functions such as computational, storage, networking or security.

Network Client—A device connected to a network that is making a request of another network connected device.

Network Packet—A unit of data that is communicated between an origin and a destination on any packet-switched network such as the Internet.

Network Policy—The rules governing network and network connected device access. A network policy describes what network devices can access other networks and network devices. Network policy is often applied at policy enforcement points or at an endpoint.

Network Topology—The physical or logical layout of devices on a network. Every network has a topology, or the way that the devices on a network are arranged and how they communicate.

Network Traffic—The flow of packets through a network and network connected devices.

Object—Data or information that is capable of being conveyed through a network or a device.

Physical Appliance—A network appliance where the appliance functionality is rendered in physical hardware and software. Compare against a virtual appliance where the appliance functionality is rendered solely in software.

Policy Enforcement Point (PEP)—In networking, a chokepoint where network policy is enforced.

Request—A message conveyed through a network or device which calls for a response or action of a recipient individual, machine or device.

Security Policy—A set of rules that must be conformed to before access is granted. In network security, examples of security policy rules include the explicit inclusion or exclusion of specific network addresses, the avoidance of protocol violations, the presence of attribution information and the specific inclusion or exclusion of specific identities indicated by attribution information.

SOI—Statistical Object Identification. A method of communicating a statistical representation of an original object.

SSL—Secure Sockets Layer. A security protocol defined by the Internet Engineering Task Force (IETF).

TAC—Transport Access Control. A method of determining identity on the first packet of a TCP session.

TAC Bidirectional Identity Token—A TAC Identity token that is communicated during TCP SYN/ACK processing.

TCP—TCP is the Transmission Control Protocol. Using TCP, networked devices can create connections to one another, over which they can send data. The TCP protocol insures that data sent by one endpoint will be received in the same order by the other, and without any pieces missing. The TCP protocol also distinguishes data for different applications (such as a Web server and an email server) on the same device.

TCP SYN/ACK Processing—The response by a TCP/IP protocol stack upon receiving a TCP SYN to establish a TCP session. This is performed in accordance with the TCP specification.

TCP SYN Bit—A control bit within the TCP header that indicates a request for TCP session establishment.

TCP Session Initiation—The process of establishing a TCP session. This is performed in accordance with the TCP protocol specification.

TLS—Transport Layer Security. A security protocol defined by the Internet Engineering Task Force (IETF).

Virtual Appliance—A network appliance where the appliance functionality is rendered solely in software. Compare against a physical appliance where the appliance functionality is rendered in physical hardware and software.

V. Preferred and Alternative Embodiments

FIG. 1 is an illustration of the prior art showing unidirectional operation. A conventional stateful firewall A comprises prior art elements: a network information collector B, a security policy engine C, a table of security policies D and a network state table E.

Figure 2:
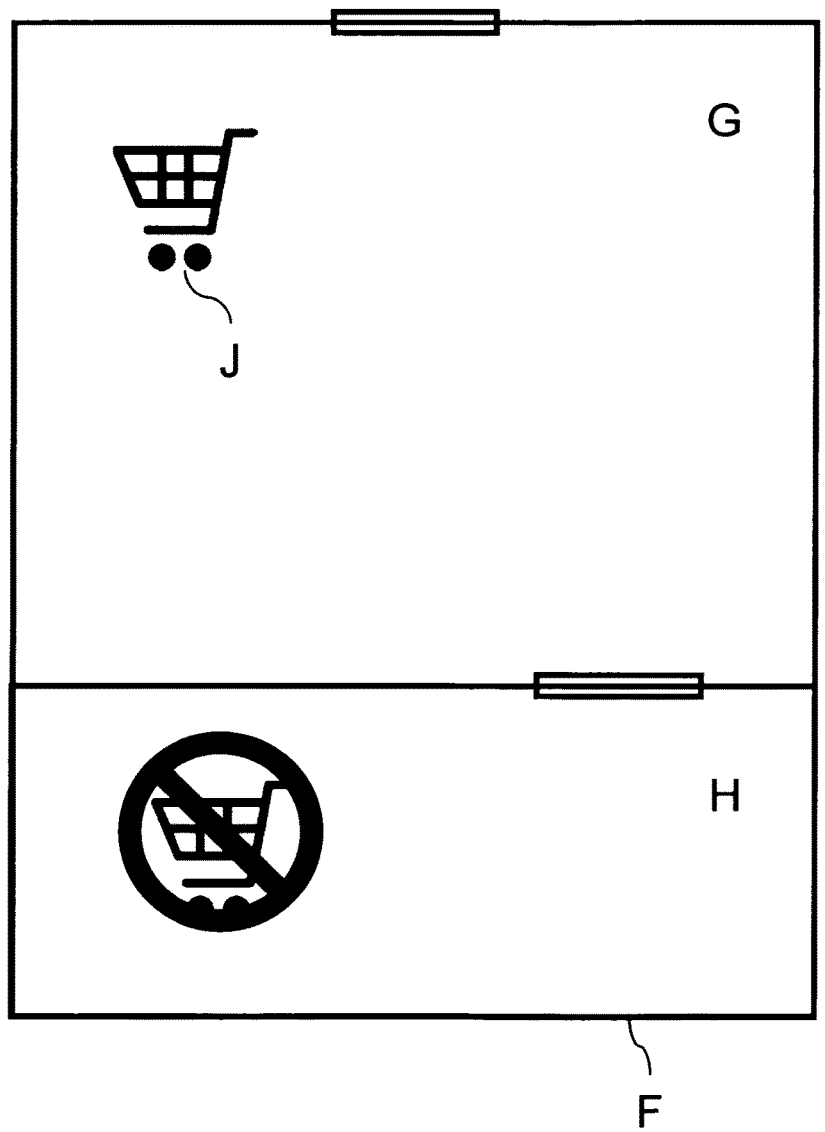
FIG. 2 is an illustration of a retail shopping store with different attribution policies.

FIG. 2 is an illustration of a retail shopping store with different attribution policies. A retail shopping store F is composed of two areas, a public shopping area G and a private stockroom area H. A shopper J is shopping in the public shopping area G.

Figure 3:
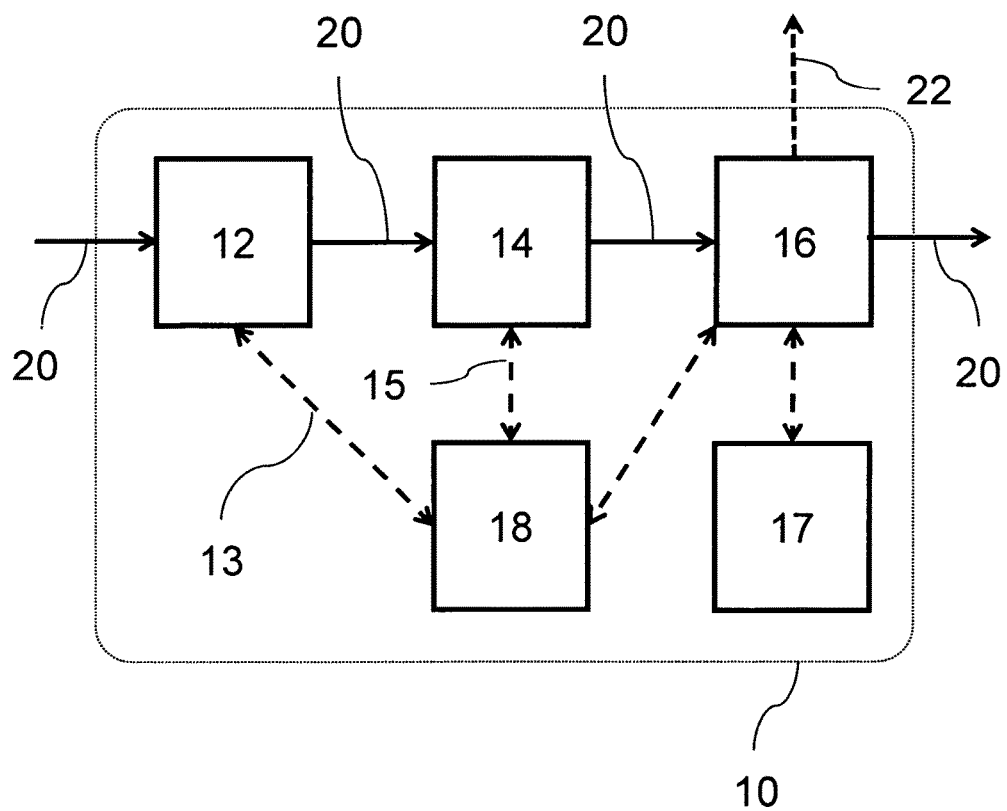
FIG. 3 is an illustration of the present invention showing unidirectional operation.

FIG. 3 is an illustration of the present invention showing unidirectional operation. A network packet 20 enters the attribution security system 10 at the network information collector 12. The network packet 20 is processed and conveyed to an attribution information collector 14, and is then processed and conveyed to a security policy engine 16 which accesses a table of security policies 17. Each of the network information collector 12, the attribution information collector 14 and the security policy engine 16 may read and write network information 13 to a network state table 18. The security policy engine 16 may also communicate log information 22 with another entity.

Figure 4:
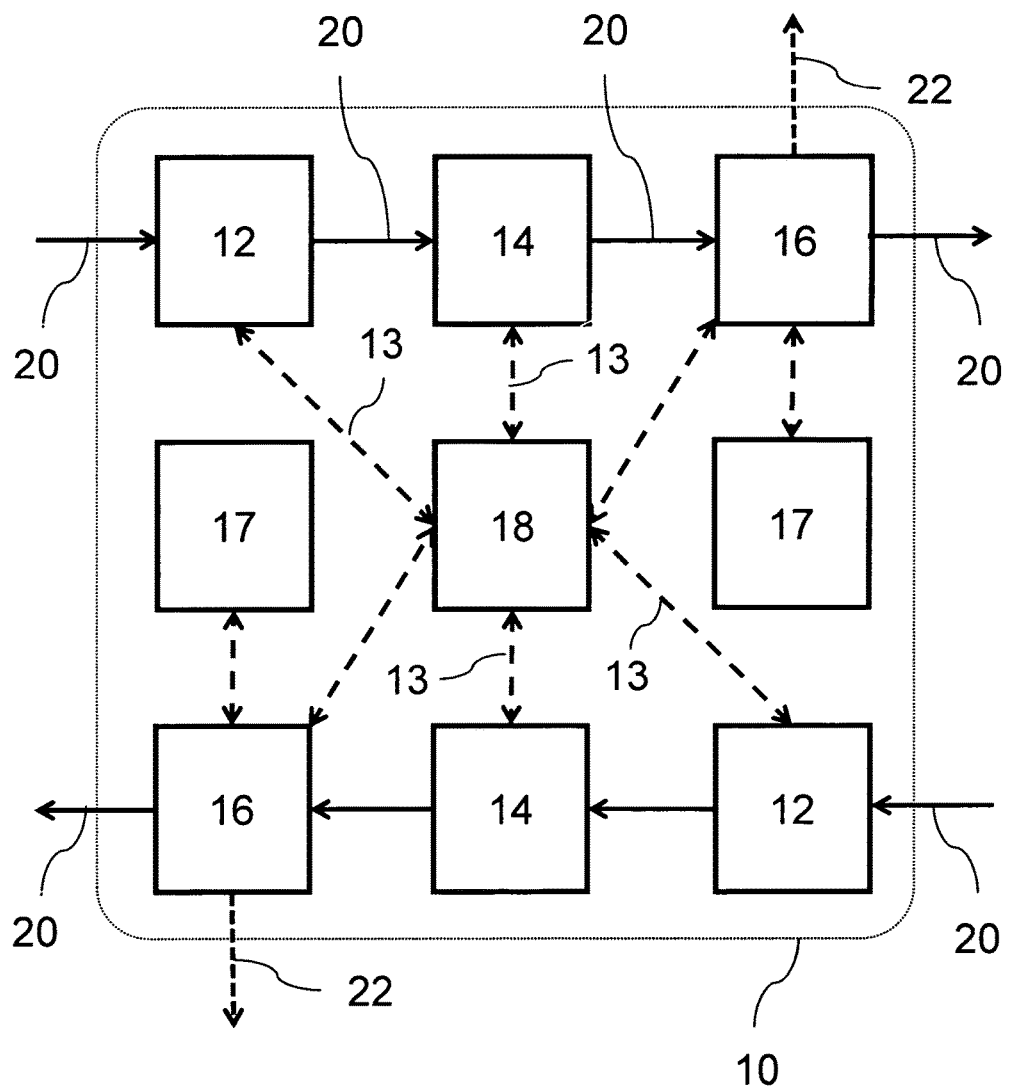
FIG. 4 is an alternate illustration of the present invention showing bidirectional operation.

FIG. 4 is an alternate illustration of the present invention showing bidirectional operation. A network packet 20 enters the attribution security system 10 at the network information collector 12. The network packet 20 is processed and conveyed to an attribution information collector 14, and is then processed and conveyed to a security policy engine 16 which accesses a table of security policies 17. Each of the network information collector 12, the attribution information collector 14 and the security policy engine 16 may read and write network information 13 to a network state table 18. The attribution information collector 14 may write attribution information 15 to a network state table 18. The security policy engine 16 may read attribution information 15 from the network state table 18. The security policy engine 16 may also communicate log information 22 with another entity.

Figure 5:
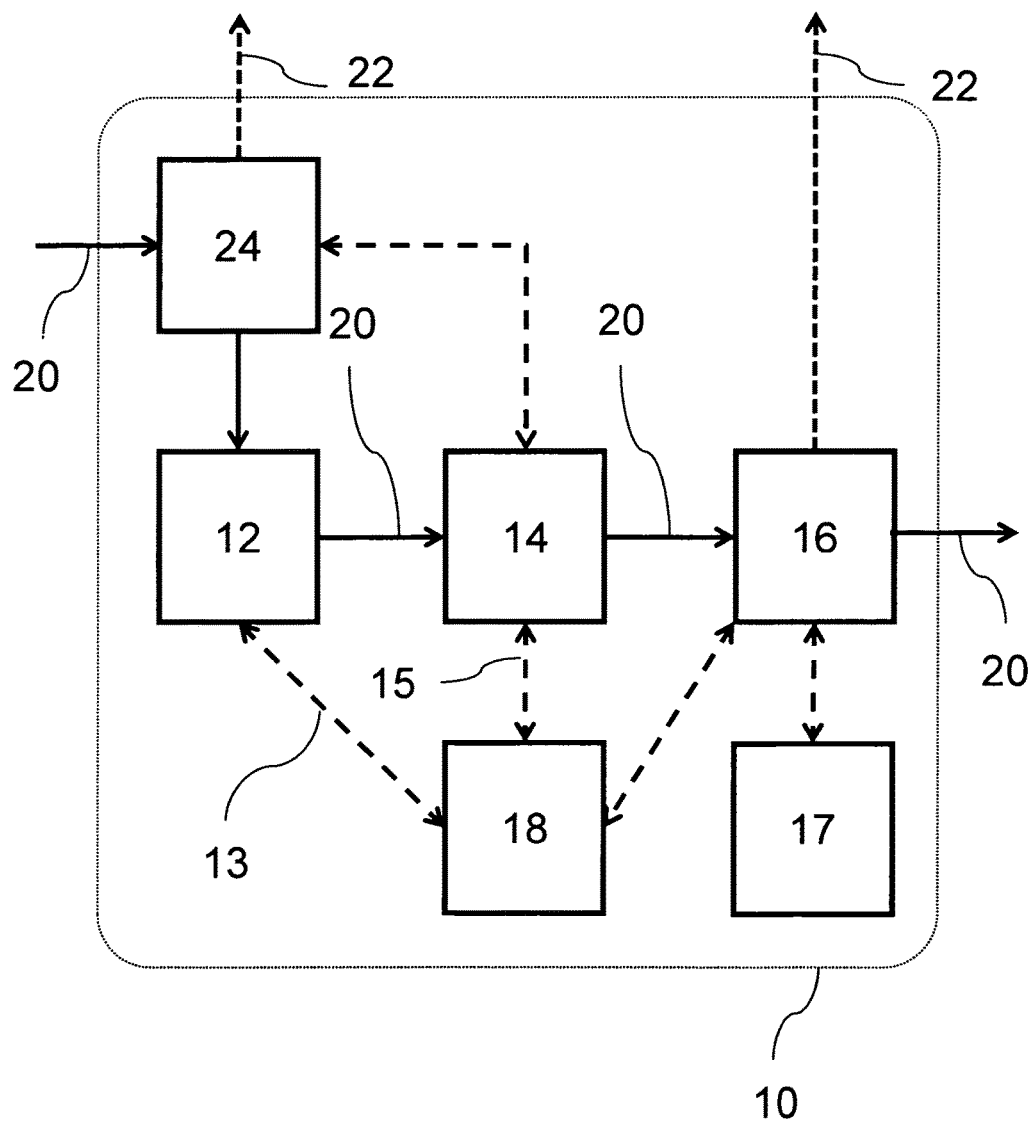
FIG. 5 is an alternate illustration of the present invention with a protection filter.

FIG. 5 is an alternate illustration of the present invention with a protection filter. A network packet 20 enters the attribution security system 10 at the protection filter 24. The network packet 20 is processed and may be conveyed to a network information collector 12, and is then processed and conveyed to an attribution information collector 14. The network packet 20 is processed by the attribution information collector 14 and then conveyed to a security policy engine 16 which accesses a table of security policies 17. Each of the network information collector 12, the attribution information collector 14 and the security policy engine 16 may read and write network information 13 to a network state table 18. The attribution information collector 14 may write attribution information 15 to a network state table 18. The security policy engine 16 may read attribution information 15 from the network state table 18. The attribution information collector 14 may read and write information to the protection filter 24. The security policy engine 16 and the protection filter 24 may also communicate log information 22 with another entity.

Figure 6:
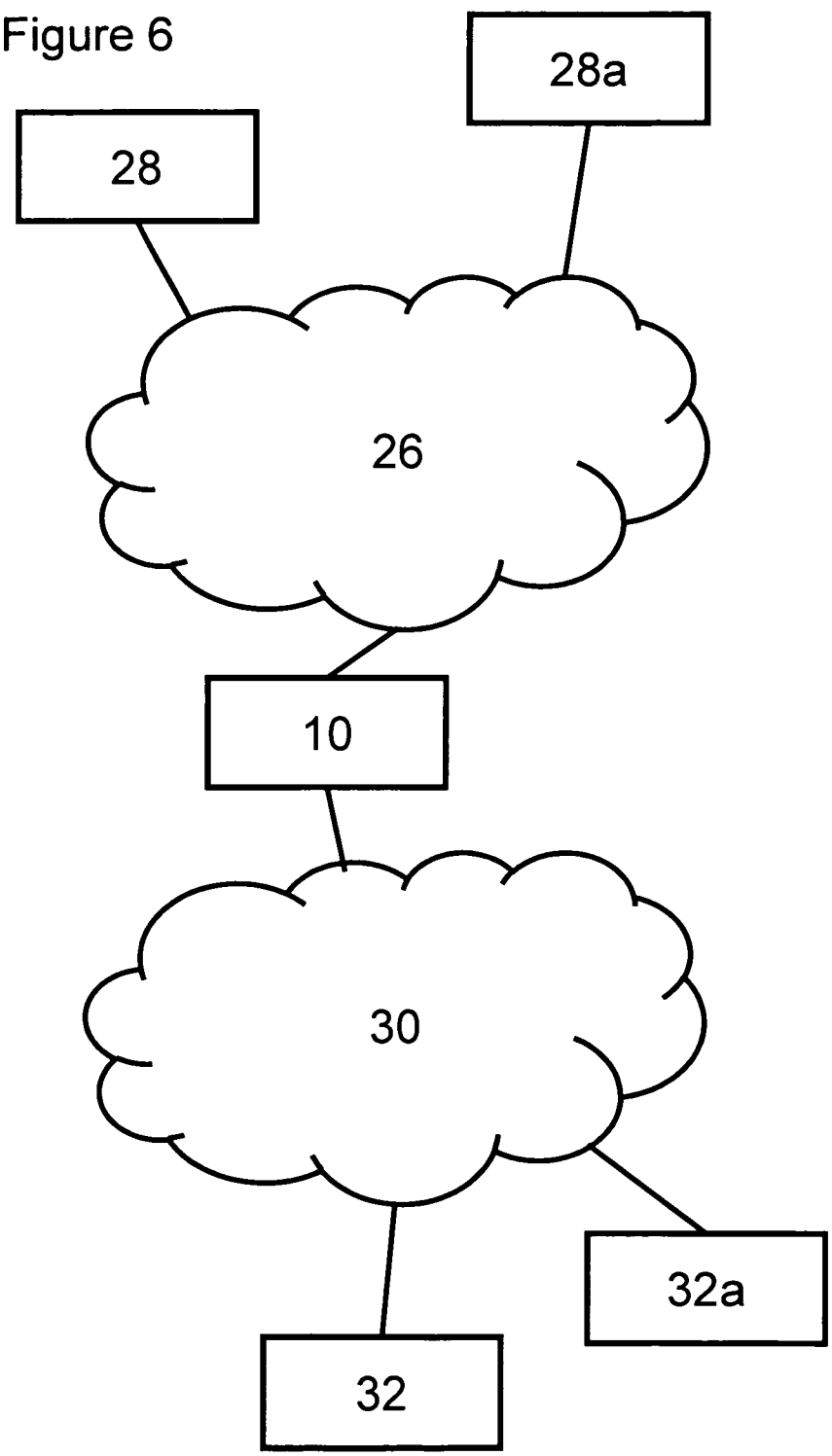
FIG. 6 is an illustration of the present invention in a network.

FIG. 6 is an illustration of the present invention in a network. A network client 28, a network client with attribution information 28a and an attribution security system 10 are connected to a first network 26. The attribution security system 10, a network service 32 and a network service accessible only with attribution information 32a are connected to a second network 30.

VI. Methods of Operation for Attribution Security System

An attribution security system 10 combines the functionality of a conventional stateful firewall A with an attribution information collector 14 resulting in increased security for network services 32 that are accessible with and without attribution information.

In a preferred embodiment, network packets 20 are received by an attribution security system 10 at a network information collector 12. The network information collector 12 collects and stores network information 13 about the network packet 20 in a network state table 18. The network information 13 about the network packet 20 may include IP, TCP and lower layer protocol information and other network and transport protocol information. The network information collector 12 does not use deep packet inspection to look into the payload portion of network packets and therefore does not collect application information.

The network state table 18 maintains network information 13 about network packets 20, transport protocols and local implementation details. Computer networks operate by communicating packets 20 of information. Multiple network packets 20 are grouped together for form conversations, known as sessions. Because networks can support many applications and devices communicating simultaneously, packets from differing sessions become intermixed with one another. The network state table 18 enables the attribution security system 10 to sort out the network packets 20 into their corresponding sessions and allows security policies to be applied to sessions, not just network packets 20.

The network packet 20 is then conveyed to the attribution information collector 14. The attribution information collector 14 collects and stores attribution information 15, if present, in the network state table 18. The attribution information 15 about the network packet 20 may include the identity of the sending device that sent the network packet, the identity of the user who caused the network packet to be sent, a composite identity describing one or more of the user identity, the sending device identity, the identity of the application on the sending device that caused the network packet to be sent, the security posture of the sending device and other metadata that communicates and augments attribution information. The attribution information collector 14 may also store an indication of the lack of attribution information present in the network packet 20 in the network state table 18.

The network packet 20 is then conveyed to the security policy engine 16. The security policy engine 16 has a number of configured security policies in a table of security policies 17 that determine how each network packet 20 should be handled. Security policies are generally composed of a matching criteria and an action. Examples of matching criteria are the matching of an source network address or range of network addresses, the matching of a destination network address or range of addresses, the determination that the network packet 20 is part of an established network session, the presence of attribution information 15 in the network packet 20 or the matching of a destination port number or range of port numbers. Multiple matching criteria can be combined to form a security policy. Each matching criteria also has an associated action that described what to do with the network packet 20. Examples of associated actions are discarding the packet, forwarding the packet to its intended destination, routing the packet to an alternate destination address, placing a marker within the network packet, or prioritizing the processing of the network packet. The security policy engine 16 uses the network packet 20, the network state table 18 and the table of security policies 17 to select a security policy. The security policy engine 16 then applied the action from the selected security policy to the network packet 20. The security policy engine 16 may communicate the selected security policy to an external entity as log information 22. This allows an external entity to receive and processes logs from network devices and policy enforcement systems for purposes of aggregation, storage, display, data mining or analytics. Log information 22 may contain information in addition to the selected security policy including the time and date of the selection, network information 13 used to make the selection, attribution information 15 used to make the selection, and the identity of the attribution firewall making the selection.

The result of this is an attribution security system 10 that processes un-attributable network traffic like a conventional firewall and can process attributable traffic to provide additional security to network resources that are accessible only with attribution information 32a.

In an alternate embodiment of an attribution security system 10, a protection filter 24 is placed ahead of the network information collector 12. Network packets 20 are received by the attribution security system 10 at the protection filter 24. The protection filter 24 filters received network packets 20 based on criteria specified by the attribution information collector 14 and may include the source network address. The attribution information collector 14 is able to determine source network addresses that do not have attribution information but are mounting attacks against network services accessible only with attribution information 32a. The attribution information collector 14 determines that an attack is occurring whenever an access attempt is made by a network client 28 that does not include attribution information to a network service accessible only with attribution information 32a. Those source network addresses of the attacking network client 28 are communicated to the protection filter 24 and the protection filter 24 then uses this information to provide additional protection to all network services 32. Like the network information collector 12, the protection filter 24 does not use deep packet inspection to look into the payload portion of the network packet and therefore does not collect application information.

The network packet 20 is then conveyed to the network information collector 12 and processed as described above.

VII. Apparatus for Attribution Security System

The apparatus for an attribution security system 10 is varied and diverse. The attribution security system 10 may be implemented as a software module that is loaded or linked into an operating system. The attribution security system 10 may be created using software or firmware and may also be offloaded to a separate processing module where the functionality is provided by software, firmware, hardware or a combination of these. The attribution security system 10 may also reside within a hypervisor, providing security services to multiple operating system instances. The hypervisor functionality may also be implemented as software or firmware and may also be implemented as a separate processing module where the functionality of the hyper visor and the attribution security system 10 is provided by software, firmware, hardware or a combination of these.

The attribution security system 10 may be implemented as a physical appliance. The attribution security system 10 may also be implemented as a virtual appliance that operates within a hypervisor environment. Both the physical appliance and the virtual appliance may be constructed using software, firmware or hardware or a combination of these. In the case of a virtual appliance and hardware offload, some functions provided by the attribution security system 10 may be offloaded to hardware offload devices available within the virtual environment.

The apparatus that performs attribution security system may be used in communications devices, security devices, network routing devices, application routing devices, service delivery devices and other devices that are secured by the addition of the efficient use of an attribution security system.

VII. Analogy to Aid in the understanding of the Invention

FIG. 2 shows a retail shopping store F. The retail shopping store F is divided into a public shopping area G and a private stockroom area H. A shopper J is allowed access to the public shopping area G, but only employees are allowed in the private stockroom area H. If a shopper J is caught in or attempting to enter the private stockroom area H, the shopper J is removed from both the private stockroom area H and the public shopping area G. Because of the shopper's J behavior of not following the rule that only employees are allowed in the private stockroom area H, the shopper may be banned from entering the store F completely. This is analogous to the present invention where the attribution security system 10 allows a network client 28 access to a network service 32. If the network client 28 attempts to access a network service accessible only with attribution information 32a and the network client 28 does not have attribution information or is not authorized to access the resource, then the network client may be blocked from accessing a network service 32 that would otherwise be accessible if the network client 28 did not violate the security rules and policies.

CONCLUSION

Although the present invention has been described in detail with reference to one or more preferred embodiments, persons possessing ordinary skill in the art to which this invention pertains will appreciate that various modifications and enhancements may be made without departing from the spirit and scope of the claims that follow. The various alternatives for providing an efficient means for an attribution security system that have been disclosed above are intended to educate the reader about preferred embodiments of the invention, and are not intended to constrain the limits of the invention or the scope of Claims. The List of Reference Characters which follows is intended to provide the reader with a convenient means of identifying elements of the invention in the Specification and Drawings. This list is not intended to delineate or narrow the scope of the Claims.

LIST OF REFERENCE CHARACTERS

A Conventional Stateful Firewall
B Network Information Collector
C Security Policy Engine
D Network State Table
E Table of Security Policies
F Retail Shopping Store
G Public Shopping Area
H Private Stockroom
J Shopper
10 Attribution Security System
12 Network Information Collector
13 Network Information
14 Attribution Information Collector
15 Attribution Information
16 Security Policy Engine
17 Table of Security Policies
18 Network State Table
20 Network Packet
22 Log information
24 Protection Filter
26 First Network
28 Network Client
28a Network Client with Attribution Information
30 Second Network
32 Network Service
32a Network Service accessible only with Attribution Information

What is claimed is:

1. A method comprising the steps of:
providing an attribution security system (10); said attribution security system (10) including a network information collector (12), an attribution information collector (14), a security policy engine (16), a table of security policies (17) containing a plurality of security policies and a network state table (18);
receiving a network packet (20) from an initiator by said attribution security system (10);
extracting network information from said network packet (20) by said network information collector (12);
storing said network information in said network state table (18);
extracting attribution information from said network packet (20) by said attribution information collector (14);
said attribution information being obtained by using Statistical Object Identity for determining an identity of said initiator of a communication;
wherein said Statistical Object Identity is used to receive and to aggregate received statistical objects until an original object is unambiguously determined and the calculated probability satisfies a trusted probability threshold;
storing said attribution information in said network state table (18);
selecting a security policy from one of said plurality of security policies in said table of security policies (17) by said security policy engine (16);
said selecting of said security policy includes using information from said network table (18);
said selecting of said security policy includes using said attribution information;
processing said network packet (20) in accordance with said selected security policy; and
said security policy engine (16) for applying said selected security policy to said network packet (20), and, therefore, also to said initiator of said network packet (20).

2. A method as recited in claim 1, further comprising the steps of:

communicating said selected security policy as log information (22).

3. A method as recited in claim 1, in which:
said selected security policy requires attribution information.

4. A method as recited in claim 1, in which:
said attribution information is obtained by using Transport Access Control.

5. A method as recited in claim 1, in which:
said attribution information is obtained without using application information.

6. A method as recited in claim 1, in which:
said selected security policy results in the discarding of said network packet (20).

7. A method as recited in claim 1, in which:
said selected security policy results in the forwarding of said network packet (20).

8. A method as recited in claim 1, in which:
said selected security policy results in the redirection to an alternate destination of said network packet (20).

9. A method as recited in claim 1, in which:
said selected security policy results in the marking of said network packet (20).

10. A method as recited in claim 1, in which:
said selected security policy results in the prioritization of said network packet (20).

11. A method as recited in claim 1, further comprising the steps of:
providing a protection filter (24) to said attribution security system (10);
receiving protection information by said protection filter (24) from said attribution information collector (14); and
filtering network packets (20) in accordance with said protection information.

12. A method as recited in claim 11, in which:
said step of filtering network packets results in the discarding of said network packets (20).

13. A method as recited in claim 11, in which:
said step of filtering network packets results in the redirection to an alternate destination of said network packets (20).

14. A method as recited in claim 11, in which:
said step of filtering network packets results in the marking of said network packets (20).

15. A method as recited in claim 11, in which:
said step of filtering network packets results in the prioritization of said network packets (20).

16. A method as recited in claim 11, in which:
said step of filtering network packets filters said network packets (20) that contain no attribution information.

17. A method as recited in claim 11, in which:
said protection information increases security for network services that do not require attribution information.

18. A method as recited in claim 11, further comprising the step of:
communicating said filtering decision as log information (22).

19. A method as recited in claim 1, in which:
the number of said received statistical objects is exactly one, which results in said original object being unambiguously determined and said calculated probability satisfying said trusted probability threshold.

20. A method as recited in claim 1, in which:
the number of said received statistical objects is greater than one, which results in said original object being unambiguously determined and said calculated probability satisfying said trusted probability threshold.

21. A method as recited in claim 1, in which:
the number of said received statistical objects is zero, and does not result in said original object being unambiguously determined, and said calculated probability not being satisfied by reaching said trusted probability threshold.

22. A method comprising the steps of:
providing a first network (26), a network client (28), a network client with attribution (28a) and an attribution security system (10);
receiving a network packet (20) from an initiator at said attribution security system;
said attribution security system (10) employs Statistical Object Identity for determining an identity of an initiator of said communication;
wherein said Statistical Object Identity is used to aggregate and to receive statistical objects until an original object is unambiguously determined and the calculated probability satisfies a trusted probability threshold;
providing a second network (30), a network service (32) and a network service accessible only with attribution information (32a);
receiving a network packet (20) from said network client (28) by said attribution security system (10);
selecting a security policy from one of said plurality of security policies in said table of security policies (17) by said security policy engine (16);
said selecting of said security policy includes using information from said network table (18);
said selecting of said security policy includes using said attribution information;
implementing security policy based on the attribution of said network packet (20) by said attribution security system (10); and
said security policy engine (16) for applying said selected security policy to said network packet (20), and, therefore, also to said initiator of said network packet (20).

23. A method as recited in claim 22, in which:
said step of implementing security policy based on the attribution of said network packet (20) is independent of the network topology between said network client (28) and said attribution security system (10).

24. A method as recited in claim 22, in which:
said step of implementing security policy based on the attribution of said network packet (20) is independent of the network topology between said network service (32) and said attribution security system (10).

25. A method as recited in claim 22, in which:
said attribution security system (10) employs Transport Access Control.

26. An apparatus comprising:
a security system means for determining attribution (10);
said security system means (10) including
a network information means for collecting network information (12);
an attribution information collector means for collecting attribution information (14); a security policy engine means for packet processing (16); and
a table of security policies (17) containing a plurality of security policies and a network state table (18);
said security system means (10) receiving a network packet (20) from said initiator;
said network information means (12) extracting network information from said network packet (20);

said network information collector means (12) storing said network information in said network state table (18);

said attribution information means for collecting attribution information (14) extracting attribution information from said network packet (20);

said attribution information is obtained by using Statistical Object Identity for determining an identity of said initiator of a communication;

wherein said Statistical Object Identity is used to receive and to aggregate statistical objects until an original object is unambiguously determined and the calculated probability satisfies a trusted probability threshold;

said attribution information means (14) storing said attribution information in said network state table (18);

said security policy engine means (16) selecting a security policy from one of said plurality of security policies in said table of security policies (17);

said selecting of said security policy includes using information from said network state table (18);

said selecting of said security policy includes using said attribution information;

said security policy engine means (16) processing said network packet (20) in accordance with said selected security policy; and said security policy engine means (16) for applying said selected security policy to said network packet (20), and, therefore, also to said initiator of said network packet (20).

27. An apparatus as recited in claim 26, in which:
said security policy engine means (16) communicating said selected security policy as log information (22).

28. An apparatus as recited in claim 26, in which:
said selected security policy requires attribution information.

29. An apparatus as recited in claim 26, in which:
said attribution information is obtained by using Transport Access Control.

30. An apparatus as recited in claim 26, in which:
said attribution information is obtained without using application information.

31. An apparatus as recited in claim 26, in which:
said selected security policy results in the discarding of said network packet (20).

32. An apparatus as recited in claim 26, in which:
said selected security policy results in the forwarding of said network packet (20).

33. An apparatus as recited in claim 26, in which:
said selected security policy results in the redirection to an alternate destination of said network packet (20).

34. An apparatus as recited in claim 26, in which:
said selected security policy results in the marking of said network packet (20).

35. An apparatus as recited in claim 26, in which:
said selected security policy results in the prioritization of said network packet (20).

36. An apparatus as recited in claim 26, in which:
said security system means (10) includes a protection filter means for receiving protection information (24);
said protection filter means (24) receiving protection information from said attribution information collector means (14);
said protection filter means (24) filtering said network packet (20) in accordance with said protection information.

37. An apparatus as recited in claim 36, in which:
said filtering of said network packet results in the discarding of said network packet (20).

38. An apparatus as recited in claim 36, in which:
said filtering of said network packet results in the redirection to an alternate destination of said network packet (20).

39. An apparatus as recited in claim 36, in which:
said filtering of said network packet results in the marking of said network packet (20).

40. An apparatus as recited in claim 36, in which:
said filtering of said network packet results in the prioritization of said network packet (20).

41. An apparatus as recited in claim 36, in which:
said filtering of said network packet filters said network packet (20) that contain no attribution information.

42. An apparatus as recited in claim 36, in which:
said protection information increases security for network services that do not require attribution information.

43. An apparatus as recited in claim 36, in which:
said protection filter means (24) communicating said filtering decision as log information (22).

* * * * *